(12) United States Patent
Wang

(10) Patent No.: US 6,643,327 B1
(45) Date of Patent: Nov. 4, 2003

(54) STATISTICAL MULTIPLEXER AND REMULTIPLEXER THAT ACCOMMODATES CHANGES IN STRUCTURE OF GROUP OF PICTURES

(75) Inventor: Limin Wang, San Diego, CA (US)

(73) Assignee: General Instrument Corporation, Horsham, PA (US)

( * ) Notice: Subject to any disclaimer, the term of this patent is extended or adjusted under 35 U.S.C. 154(b) by 0 days.

(21) Appl. No.: 09/565,960

(22) Filed: May 5, 2000

(51) Int. Cl.[7] .............................................. H04N 7/12
(52) U.S. Cl. ............................................. 375/240.12
(58) Field of Search ...................... 375/240.12, 240.02, 375/240.13, 240.14, 240.15, 240.16; 348/385.1, 388.1, 389.1; 382/239; H04N 7/12, 11/02, 11/04

(56) References Cited

U.S. PATENT DOCUMENTS

| | | | |
|---|---|---|---|
| 5,216,503 A | | 6/1993 | Paik et al. |
| 5,506,844 A | | 4/1996 | Rao |
| 5,708,664 A | | 1/1998 | Budge et al. |
| 5,963,256 A | | 10/1999 | Tahara |
| 6,038,256 A | | 3/2000 | Linzer et al. |
| 6,055,270 A | * | 4/2000 | Ozkan et al. ........... 375/240.03 |
| 6,104,441 A | * | 8/2000 | Wee et al. .............. 375/240.15 |
| 6,167,084 A | * | 12/2000 | Wang et al. ............ 375/240.02 |
| 6,323,904 B1 | * | 11/2001 | Knee ....................... 348/425.1 |
| 6,493,386 B1 | * | 12/2002 | Vetro et al. ............... 375/240.1 |
| 6,493,388 B1 | * | 12/2002 | Wang ..................... 375/240.12 |

OTHER PUBLICATIONS

L. Wang and A. Vincent, "Bit Allocation for Joint Coding of Multiple Video Programs", SPIE VCIP, pp. 149–158, Feb. 1997.
ISO/IEC/JTC1/SC29/WG11, Test Model 5, Section 10—Rate Control and Quantization Control, Apr. 1993, pp. 61–65.

* cited by examiner

*Primary Examiner*—Nhon Diep
(74) *Attorney, Agent, or Firm*—Barry R. Lipsitz; Douglas M. McAllister

(57) ABSTRACT

A system for rate control during transcoding and encoding of digital video data in a multi-program transmission environment accommodates changes in the GOP structure of any of the programs, e.g., due to a commercial insertion or the like. A hierarchical bit allocation scheme is used, where bits are allocated on a super group of pictures (GOP) level, i.e., a grouping of multiple GOPs, a super frame level, and an individual frame level. The bit allocation for the super GOP and each picture is adjusted when a change in the structure of a group of pictures (GOP) is detected for any of the pre-compressed programs. The super GOP length may also be adjusted if required to maintain an integer number of GOPs therein. A change in the GOP structure is detected based on a change in the GOP length or sub_GOP length (distance between P pictures). For pre-compressed data, initial GOP lengths and sub_GOP lengths can be assumed and adjusted as required based on actual measurements. For a current I or P picture, the sub GOP length is calculated based on temporal references of the current picture and a previous I or P picture. For a current B picture, the same calculation is used, plus one picture.

34 Claims, 7 Drawing Sheets

STATISTICAL MULTIPLEXER AND REMULTIPLEXER THAT ACCOMMODATES CHANGES IN STRUCTURE OF GROUP OF PICTURES

BACKGROUND OF THE INVENTION

The present invention relates to rate control during transcoding and encoding of digital video programs in a multi-program transmission environment, where several programs are multiplexed and transmitted over a single communication channel.

Commonly, it is necessary to adjust a bit rate of digital video programs that are provided, e.g., to subscriber terminals in a cable television network or the like. For example, a first group of signals may be received at a headend via a satellite transmission. The headend operator may desire to forward selected programs to the subscribers while adding programs (e.g., commercials or other content) from a local source, such as storage media or a local live feed. Additionally, it is often necessary to provide the programs within an overall available channel bandwidth. It may also be desired to change the relative quality level of a program by allocating more or fewer bits.

Accordingly, the statistical multiplexer (stat mux), or encoder, which includes a number of encoders for encoding uncompressed digital video signals at a specified bit rate, has been developed. The statistical remultiplexer (stat remux), or transcoder, which handles pre-compressed video bit streams by re-compressing them at a specified bit rate, has also been developed. Moreover, functions of a stat mux and remux may be combined when it is desired to transcode pre-compressed data while also coding uncompressed data for transport in a common output bitstream. Uncompressed programs are coded for the first time, while compressed programs are re-encoded, typically at a different bit rate.

For MPEG applications, a stat mux/remux must accommodate three different picture types (I, P and B), which usually require quite different numbers of bits because of the different nature of their temporal processing.

Bit allocation strategies should take the picture types into consideration. For a given bit budget, this implies a requirement of a priori knowledge of the picture organizations (GOP) of the programs. The requirement is not a problem for encoders because encoders can plan ahead for types and arrangement of pictures that it will output. However, such a priori knowledge is typically not available for transcoders, which deal with pre-compressed video bit streams.

Accordingly, it would be desirable to provide a stat mux/remux system that removes the assumption that the picture organizations are available for all the programs.

The system should provide a novel adaptive bit allocation strategy for a stat mux/remux system that requires no a priori (beforehand) knowledge of program picture organization. The system should be able to address any changes in program picture organizations, including a change in the GOP length and/or the sub-GOP length (the distance between two P-pictures in either encoding or display order).

The system should include transcoders for processing pre-compressed video bit streams, or both encoders and transcoders, for additionally handling uncompressed digital video signals.

Moreover, the system should accommodate changes in the group of pictures (GOP) structure of pre-compressed bitstreams, for example, due to switching channels, commercial insertion, changes in the program content (e.g., due to a transition from a movie to a news announcement or a sports event), and the like. The system should handle structure changes that occur at a GOP boundary or within a GOP.

The system should accommodate changes in a GOP length and/or a sub_GOP length.

The system should overcome difficulties in integrating pre-compressed program bit streams (that include, e.g., video materials such as films and the like that are pre-compressed and stored for subsequent transmission) with uncompressed digital video sequences.

The system should not require a priori (beforehand) knowledge of the picture organization (GOP structure) of programs (e.g., the GOP length, and arrangement of different picture types in the GOP). The system should avoid a processing delay of about one GOP which would otherwise be incurred to extract the complete GOP structure information from a pre-compressed bit stream. The system should also avoid the need to store the data corresponding to the GOP, thereby reducing the memory size required for transcoding.

The present invention provides a system having the above and other advantages.

SUMMARY OF THE INVENTION

The present invention relates to rate control during transcoding and coding of digital video data in a multi-program transmission environment.

The invention accounts for changes in the structure of a GOP, e.g., due to a commercial insertion or the like, to adjust the bit allocation for each picture accordingly. A change in the GOP length (increase or decrease), and/or a sub_GOP length can be accommodated. For example, a change in picture sequence from IBBPBBPBB . . . to IBPBPBPB . . . results in the sub_GOP changing from three to two.

The sub_GOP length contains information about the specific picture types and their arrangement in a GOP. Hence, even when the GOP length remains the same during a change in the input video source, we may have a different arrangement of picture types if the sub_GOP changes.

Moreover, the invention operates with a hierarchical bit allocation scheme, where bits are allocated on a super GOP, super frame, and individual frame levels.

The change in the GOP structure can occur anywhere, e.g., within a GOP or super GOP, or at a boundary of a GOP or super GOP. Once the GOP of a program changes, the length of the super GOP is re-calculated, and the allocation of bits to the super GOP is adjusted accordingly.

If there is a switch during the middle of an old GOP to another program of a new GOP, this is treated as a transition from the old GOP to an old incomplete GOP, and then to the new GOP.

A particular method in accordance with the invention is provided for coding a plurality L of video programs. The method includes the step of allocating bits for coding the video programs according to a hierarchical scheme that includes at least: (a) a super group of pictures (GOP) level, wherein a super GOP comprises at least one GOP from each of the video programs, and (b) an individual frame level. The allocating step is responsive to respective GOP structures of the video programs. The respective GOP structures of the video programs are monitored to detect any changes thereof. When a change in the GOP structure of at least one of the video programs is detected, the allocation of bits for coding the video programs in the super GOP is adjusted according to the change.

Accordingly, the invention can optimize the allocation of bits since a rate control processor maintains updated knowledge of each picture type and the arrangement of pictures for the different programs to the maximum extent possible.

Corresponding apparatuses are also presented.

DETAILED DESCRIPTION OF THE INVENTION

The present invention relates to rate control during transcoding and coding of digital video data in a multi-program transmission environment

1. INTRODUCTION

With recent advances in digital video compression and digital transmission, it is possible to deliver several video programs in the same bandwidth presently occupied by a single analog TV channel. To be squeezed into a fixed-rate channel, the video programs have to share the channel capacity. Specifically, raw pixel data is compressed, and compressed bits are transcoded. Encoders and transcoders can be thought of as rate-conversion engines. An encoder compresses a digital video sequence into a bit stream at a much lower rate while a transcoder converts a pre-compressed video bit stream into another bit stream at a new (low) rate. The aggregate rate of these compressed bit streams, however, has to be equal to, or less than, the channel rate. This can be achieved by controlling either each individual rate (independent coding) or the aggregate rate (joint coding).

In independent coding, rate control can only be performed across the time and spatial dimensions of a single program. In joint coding, control is extended to the program dimension (e.g., multiple programs). This implies more freedom in allocating the channel capacity among programs and, therefore, more control of picture quality among multiple programs as well as within a program.

A system that is able to put multiple video programs into a fixed-rate channel is called a:

1. stat mux if the inputs are all uncompressed digital video signals,
2. stat remux if the inputs are all pre-compressed video bit streams, or
3. stat mux/remux if the inputs are both uncompressed digital video signals and pre-compressed video bit streams.

A stat mux has encoders, while a stat remux only needs transcoders, and a stat mux/remux has both encoders and transcoders.

Figure 1:
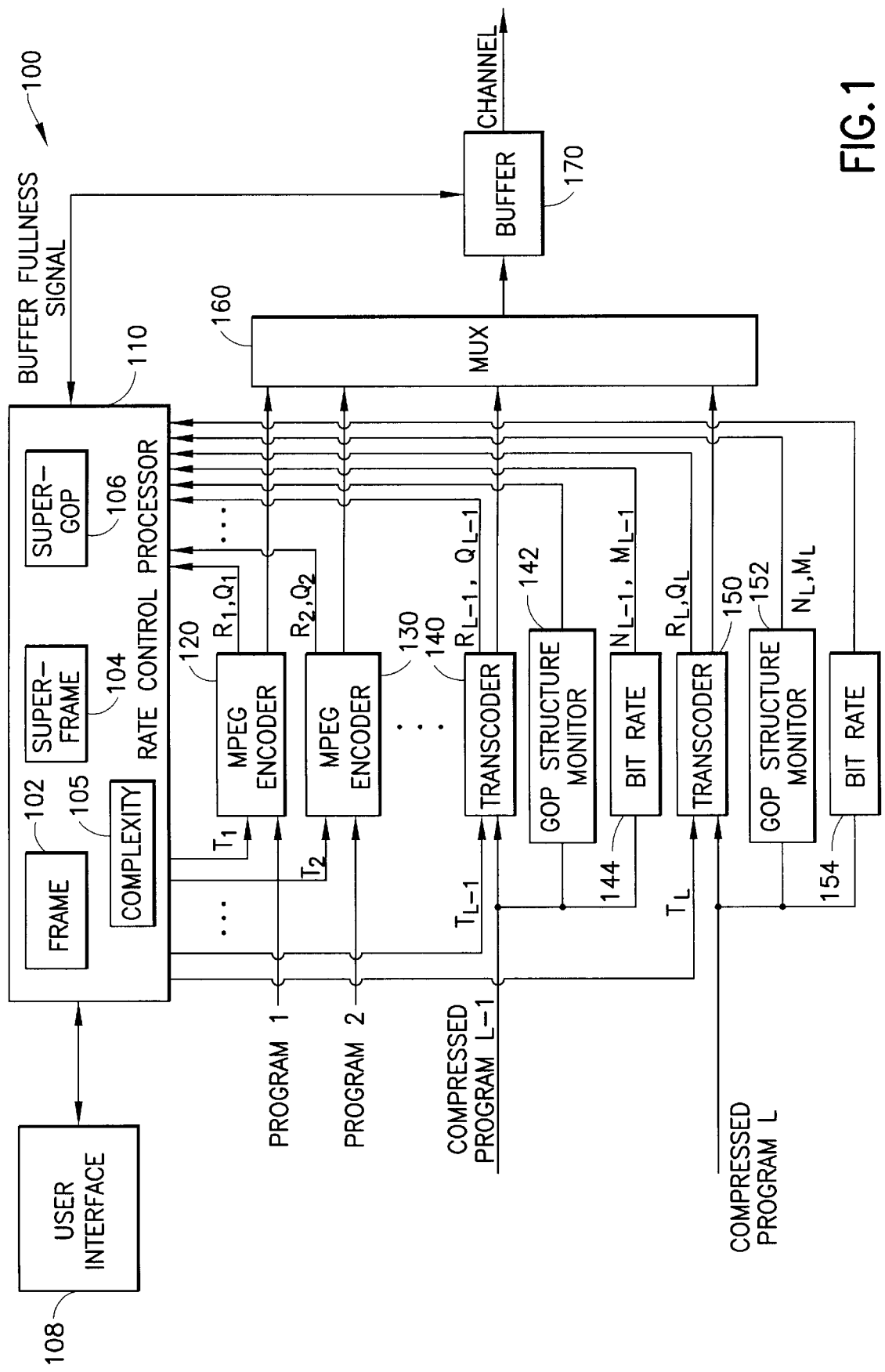
FIG. 1 illustrates a stat mux/remux with both encoders and transcoders, and a joint rate control engine, in accordance with the present invention.

FIG. 1 illustrates a stat mux/remux system in accordance with the present invention. The inputs to the stat mux/remux system 100 can include uncompressed digital video sequences and/or pre-compressed bit streams. The uncompressed digital video sequences, e.g., programs 1 and 2 are encoded by encoders 120 and 130, respectively, e.g., which use the MPEG video coding standard. The pre-compressed programs (e.g., bitstreams) L−1 and L are processed, respectively, by transcoders 140 and 150, GOP structure monitors 142 and 152, and optional bit rate functions 144 and 154.

Any known transcoder configuration may be used.

The example GOP structure monitors 142 and 152 operate as will be discussed in greater detail below to provide the GOP lengths $N_{L-1}$ and $N_L$, and sub GOP lengths $M_{L-1}$ and $M_L$, of the respective (L−1)th and Lth programs to the rate control processor 110, which adjusts the bit allocation to the different programs (via the target bit rate T) in response thereto.

The example bit rate functions 144, 154 are optional and are used to monitor the bit rate of the pre-compressed input data frames. As discussed further in connection with equation 14, the rate control processor may reduce the target bit rate for a transcoder so that it does not exceed the measured bit rate.

Note that the invention is operative when only pre-compressed bitstreams are present. Uncompressed program data is accommodated, but is not required. Moreover, any number of pre-compressed bitstreams may be accommodated, although only two are shown in FIG. 1 for simplicity.

The transcoded data and encoded data (when present) are provided to a MUX 160 and buffer 170 prior to being transmitted on a channel, typically to a decoder population. The channel may be part of a broadband communication network, such as a cable or satellite television network, for example.

The pre-compressed program data may be provided from any source, such as a storage medium (e.g., magnetic tape or compact disc), or from a satellite transmission or stat mux, for example. Pre-compressed data, such as for commercial insertion or insertion of local news or other programming, may be provided locally for use in conjunction with pre-compressed data that is received from a remote source.

The buffer 170 sends a fullness level signal to a rate control processor 110, which may adjust the target bit allocations accordingly to avoid a buffer overflow or underflow.

A user interface 108 may communicate with the rate control processor 110, for example, to set a GOP structure for the encoders 120, 130, to designate certain encoders or transcoders as having a higher priority, and so forth.

The stat mux/remux 100 provides a relatively uniform picture quality (or other designated quality level when different program priorities are assigned) within a program, and if necessary, among programs. To achieve this goal, channel capacity is dynamically distributed among programs according to a program priority as well as a frame level program complexity measure.

Each MPEG encoder 120, 130 or transcoder, 140, 150 receives a target number of bits, $T_1$, $T_2$, $T_{L-1}$ and $T_L$, respectively, from a rate control processor 110 at each frame. The rate control processor 110 includes a super GOP level processing function 106, a super frame level processing function 104, a frame level processing function 102, and a complexity processor 105. These processing functions may share common hardware such as memory and processing chips, but are shown individually for simplicity.

The target number of bits for each frame of a program is met by adjusting the quantization parameter in the MPEG encoder or transcoder. The resulting number of compressed bits, R, as well as the average quantization parameter, Q, used for each frame are then sent to the rate control processor 110 as feedback data. Specifically, the encoder 120, encoder 130, transcoder 140 and transcoder 150 produce $R_1$, $R_2$, $R_{L-1}$ and $R_L$ bits, respectively, using quantization parameters $Q_1$, $Q_2$, $Q_{L-1}$ and $Q_L$, respectively. The complexity processor 105 calculates corresponding complexity values C using R and Q for each program. The rate control processor 110 then determines a new target number of bits for each new program frame or picture based on the program complexity at the frame level.

The rate control processor 110 is also responsive to the GOP structure data from the transcoders 140, 150.

Ideally, a stat mux/remux system distributes the channel capacity over the input programs according to the programs' relative complexity measures. That is, more complex programs are assigned more bits, and less complex programs are assigned fewer bits. For a given rate, this also implies that the rate assigned for a program depends on the complexity measures of the program and the other programs. Since the program complexity may vary with time, the programs' relative complexity measures vary as well. The distribution of channel capacity, or bit allocation, over programs therefore has to be a time-varying function (e.g., on a frame-by-frame basis).

Furthermore, MPEG (ISO/IEC (MPEG-2), "Generic coding of moving pictures and associated audio", March 1994) defines three picture types in terms of temporal processing (I, P and B), and the organization of the three pictures (GOP) can be very flexible. Due to the different nature of their temporal processing, the three pictures may require very different numbers of bits. Hence, to wisely use the bit budget over the input programs, the program picture organizations should also be taken into consideration. However, for a transcoder, the program picture organization is embedded in the pre-compressed bit stream and is therefore not available as the bit stream is being received. While a transcoder can learn the program picture organization of an input pre-compressed bit stream, e.g., by scanning the bit stream by about one GOP, this results in processing delays and the need for additional memory space, which increases costs. Moreover, a further complication is that the extra memory requirement will vary for programs with different GOP-lengths.

The present invention operates on the assumption that a priori knowledge of program GOP structures is not available to the transcoders. The invention starts with a reasonable assumed program picture organizations (GOP length and sub_GOP length), and provides gradual adjustments to the assumed organization when necessary. A GOP length of fifteen pictures, and a sub GOP length of three pictures is a reasonable assumed organization in many cases. For example, N=15 and M=3 corresponds to a picture organization of . . . BBIBBPBBPBBPBBPBBI . . . , while N=10 and M=2 corresponds to a picture organization of . . . BIBPBPBPBPBI . . .

2. DYNAMIC BIT ALLOCATION

A hierarchical dynamic bit allocation strategy for a stat mux system is discussed in U.S. patent application Ser. No. 09/141,265 to L. Wang and A. Luthra, filed Aug. 27, 1998, and entitled "Dynamic Bit Allocation For Statistical Multiplexing Of Compressed And Uncompressed Digital Video Signals." At the top level of the hierarchy, the concept of a super GOP (Groups of Pictures) is introduced. Specifically, the programs are conceptually divided into super GOPs, each having the same number of I, P and B pictures, that are assigned the same nominal number of bits.

A super frame is defined at a middle level of the hierarchy, which is a collection of frames, one from each of the programs at the same frame instant. A super frame is assigned a target rate according to its relative complexity measures. The same idea is extended to the regular, individual frame, at a lower level of the hierarchy, where a target rate for a frame is proportional to its complexity measure.

Moreover, to ensure the encoder and decoder buffers never overflow or underflow, and to limit each individual average rate, additional constraints are applied on the target number of bits for the super frame as well as for the regular frame.

The present invention extends the hierarchical dynamic bit allocation strategy to a stat mux/remux system.

2.1 Super GOP and Nominal Rate

Figure 2:
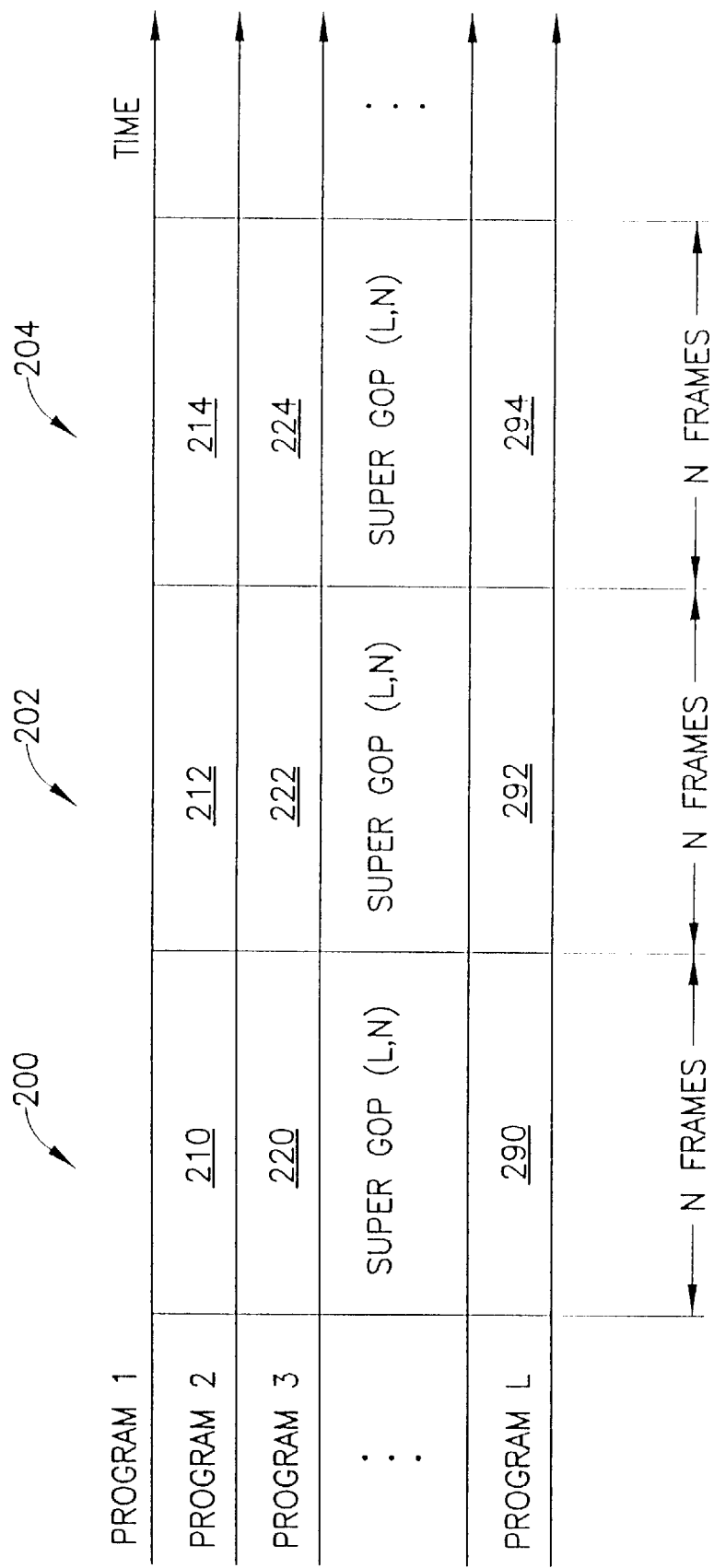
FIG. 2 illustrates a super group-of-pictures (GOP) construct in accordance with the present invention.

As shown in FIG. 2, we conceptually divide L input video programs into identical super GOPs(L,N) in terms of the number of frames of each picture type. A first super GOP 200 includes data frames from program 1 (210), program 2 (220), . . . , through program L (290). Each program segment, e.g., 210, 220, 290, contains a number of complete frames from one or more GOPs. A second super GOP 202 includes data frames from program 1 (212), program 2 (222), . . . , through program L (292). A third super GOP 204 includes data frames from program 1 (214), program 2 (224), . . . , through program L (294).

Here, L is the number of programs, which is given, and N is the length of the super GOPs, which is set equal to the Least Common Multiple (LCM) of the program GOP lengths of $N_l$, l=1,2, . . . , L, i.e., $$N = LCM(N_1, N_2, \ldots, N_L) \tag{1}$$

For example, if there are two different GOP lengths for N programs, say nine and fifteen, the super GOP length N=45. Since N is the smallest integer that can be divided by all the program GOP lengths, $N_l$, l=1,2, . . . , L, the super GOPs(L, N) are the smallest identical groups containing the same number of frames of each picture type. A super GOP(L,N) already contains the integer number of GOPs for each program l, that is, $N/N_l$. Super GOPs(L,N) with N defined in (1) contain the same number of I, P and B pictures, and hence, they are assigned the same nominal number of bits, $$T_{L \times N} = (L \times N) \cdot R_{channel(bpf)} \tag{2}$$

where $R_{channel(bpf)}$ is the average number of bits per frame.

The number of I, P and B pictures in a GOP for program l are, respectively, $N_{l,I}=1$, $N_{l,P}=N_l/M_l-N_{l,I}=N_l/M_l-1$, and $N_{l,B}=N_l-N_{l,P}-N_{l,I}=N_l-N_l/M_l-1$.

2.2 Super Frame and Target Rate

Figure 3:
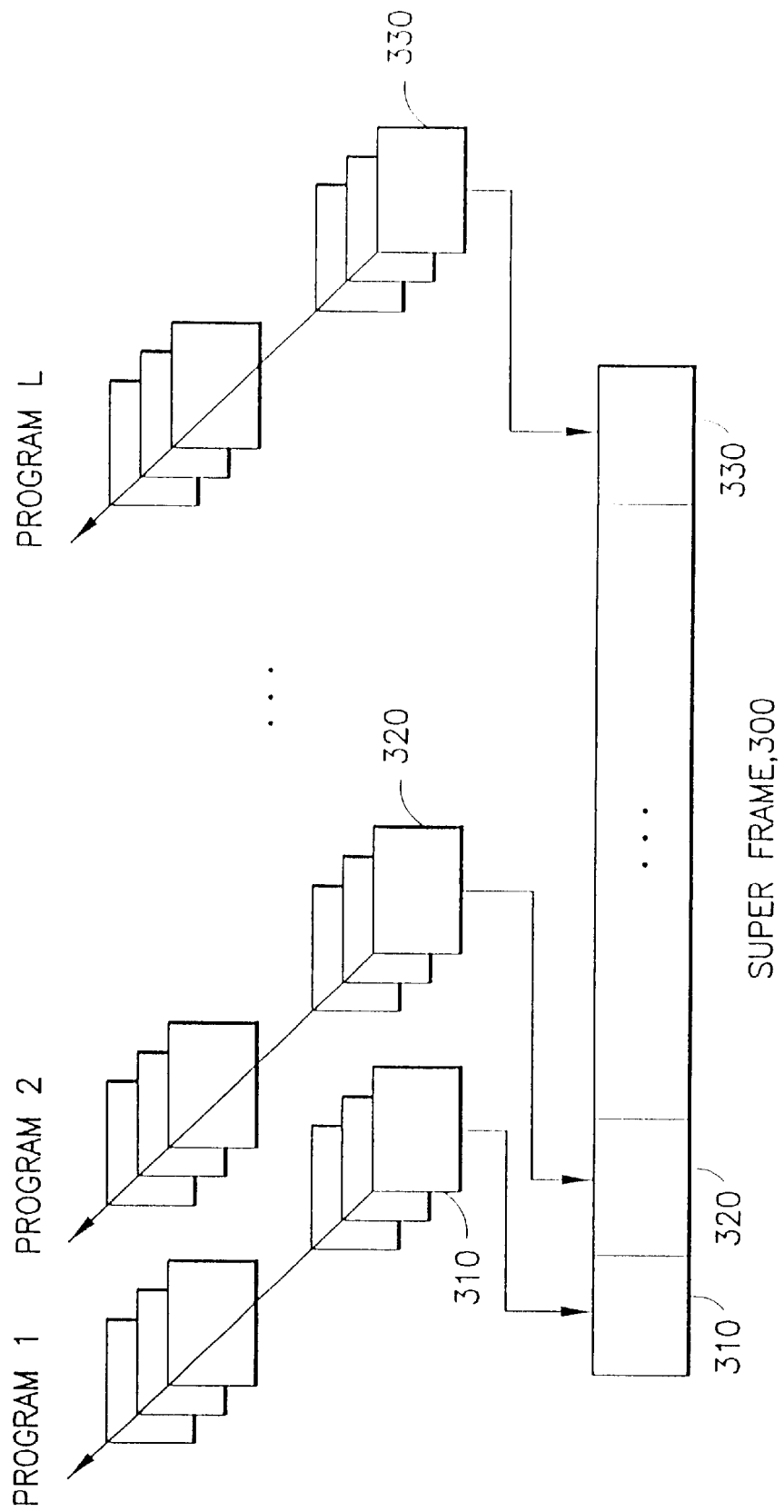
FIG. 3 illustrates a super frame construct in accordance with the present invention.

FIG. 3 illustrates a super frame, which is a collection of L frames, one from each of L programs at the same time instant.

At each frame instant n, we can further imagine a super frame 300, which is a collection of L frames or pictures, one from each of the L programs taken at the same frame instant. For example, frame 310 from program 1, frame 320 from program 2, . . . , through frame 330 of program L are conceptually arranged in the super frame 300. Clearly, a super GOP consists of N super frames. Moreover, since these L programs may have different GOP structures, the L frames in a super frame can have different picture types.

The target number of bits for super frame n is given as:

$$T_n = \frac{\sum_{l=1}^{L} \alpha_l \beta_l \gamma_{l,n,t} C_{l,n,t}}{\sum_{l=1}^{L} [n_{l,I} \alpha_l \beta_l \gamma_I C_{l,I} + n_{l,P} \alpha_l \beta_l \gamma_P C_{l,P} + n_{l,B} \alpha_l \beta_l \gamma_B C_{l,B}]} R \quad (3)$$

where $C_{l,n,t}$ is the complexity measure for frame n of program l with picture type t∈{I,P,B}, and it can be either $C_{l,I}$, $C_{l,P}$, or $C_{l,B}$, depending upon the associated picture type of I, P or B. TM5 defines a complexity measure for a frame as the product of the number of bits generated from the frame and the average quantization parameter used for the frame. Other complexity measures are also allowed.

$\alpha_l$ is a constant factor for addressing the spatial resolution of program l.

$\beta_l$ is the quality (or priority) weighting factor for program l, which will be determined by the program provider.

$\gamma_{l,n,t}$ is a constant factor used to compensate for the picture type t∈{I,P,B} of frame n of program l. It can be either $\gamma_I$, $\gamma_P$ or $\gamma_B$, depending upon the picture type of I, P or B.

$n_{l,I}$, $n_{l,P}$ and $n_{l,B}$ are the remaining number of I, P and B pictures, respectively, for program l in the current super GOP. For a new super GOP, they are reset, and then decreased by one after a picture of the corresponding type is processed.

R is the remaining number of bits for the current super GOP, defined as $$R = R + \sum_{l=1}^{L} (T_{l,n-1} - R_{l,n-1}).$$

Here, $T_{l,n-1}$ and $R_{l,n-1}$ are, respectively, the target and actual rates for frame n−1 of program l. Hence, $$\sum_{l=1}^{L} (T_{l,n-1} - R_{l,n-1})$$

is the number of leftover bits from frames n−1 of program l=1,2, . . . , L, which can be either positive or negative. At the beginning of a new super GOP, R needs to be updated as R=R+$T_{L \times N}$, where R on the right side of the equation is the number of bits leftover from the previous super GOP, which can be positive or negative.

Note that the numerator on the right side of equation (3) is the sum of complexity measures for all the frames in super frame n. On the other hand, the denominator can be considered as the sum of complexity measures for all the remaining frames in the current super GOP. Hence, equation (3) actually assigns a target number of bits for a super frame in proportion to the super frame's complexity measure.

2.3. Preventing Encoder Buffer Overflow or Underflow

To prevent the encoder buffer 170 from overflowing or underflowing, certain constraints are applied by setting upper and lower bounds for the target rate for super frames. This can be achieved according to the techniques set forth in U.S. patent application Ser. No 09/533,457 to L. Wang, filed Apr. 19, 2000, and entitled "Rate Control And Buffer Protection For Variable Bit Rate Video Programs Over A Constant Rate Channel".

2.4 Target Rate for Regular Frame

Given a target number of bits for a super frame n, $T_n$, the target number of bits for frame n of program l w $$T_{l,n} = \frac{\alpha_l \beta_l \gamma_{l,n,t} C_{l,n,t}}{\sum_{l=1}^{L} \alpha_l \beta_l \gamma_{l,n,t} C_{l,n,t}} T_n. \quad (4)$$

Here, the numerator on the right is the complexity measure for frame n of program l, and the denominator can be considered as the complexity measure for super frame n. Hence, a frame is assigned a target rate proportional to its complexity measure.

The target rates determined by equation (4) are based upon the frame relative complexity measure. For transcoders, they may need further adjustment. Specifically, the target rate for a frame determined by (4) could be larger, or smaller, than the old rate for the frame in the input pre-compressed bit stream. A rate-conversion transcoder is, however, a device for converting a pre-compressed video bit stream into another bit stream at a new rate. It cannot improve the quality of a pre-compressed video signal regardless of whether the new bit rate is smaller or greater than the old bit rate.

Thus, allocating more bits for a (pre-compressed) frame wastes the bits. Hence, in accordance with the invention, if the target rate for frame n of programs 1, $T_{l,n}$, (4) is greater than the old rate for the frame in the input pre-compressed bit stream, say $R_{old,l,n}$, the old rate should be applied, i.e., $$T_{l,n} = \begin{cases} T_{l,n} & \text{if } T_{l,n} < R_{old,l,n} \\ R_{old,l,n} & \text{if } T_{l,n} > R_{old,l,n}. \end{cases} \quad (5)$$

This can be achieved using the example bit rate functions 144, 154 of FIG. 1 by measuring the bit rate of a picture in the received bit stream, e.g., using a bit counter, and sending this information to the rate control processor 110 to reduce the allocated bits, T, for the associated transcoder, if required.

2.5 Preventing Decoder Buffer Overflow or Underflow

Figure 4:
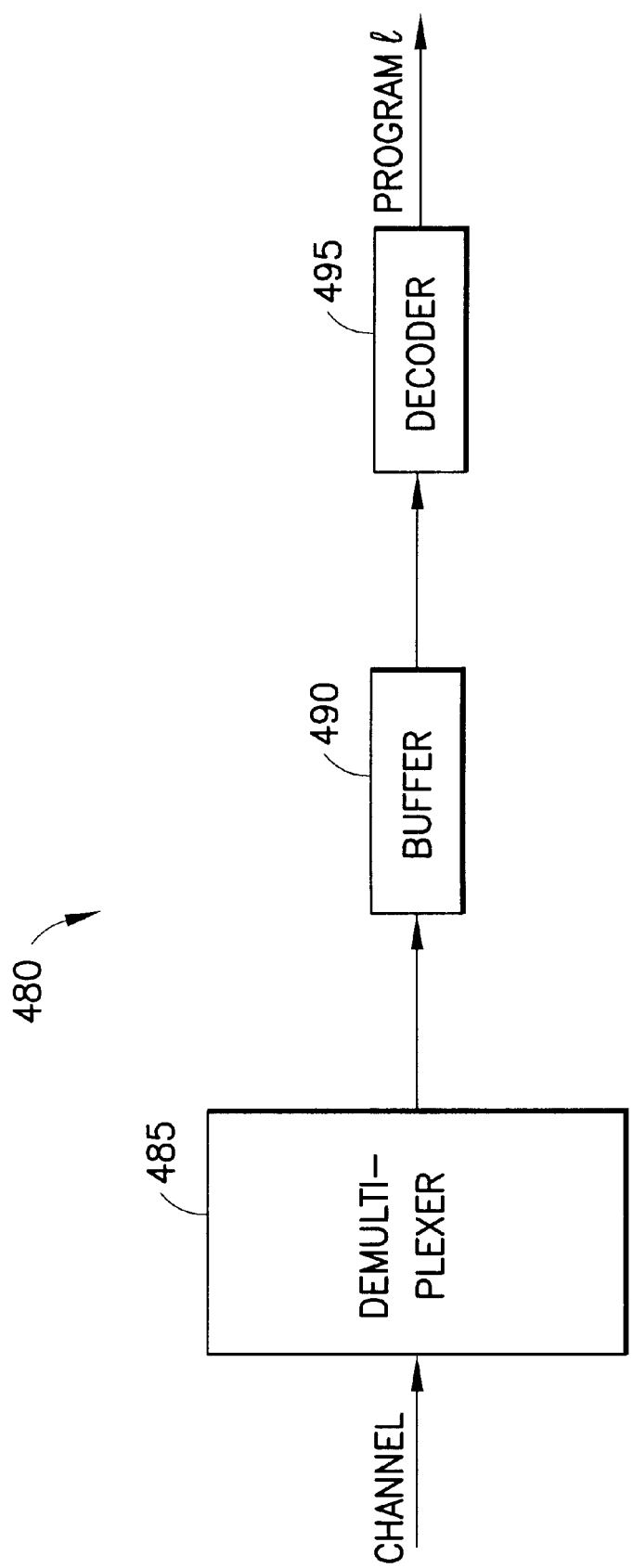
FIG. 4 illustrates a decoder for receiving data from the stat mux/remux of FIG. 1 in accordance with the present invention.

FIG. 4 illustrates a decoder for receiving data from the stat mux/remux of FIG. 1, where packets of a selected program are extracted and decoded. At the receiving end 480, the decoder 495 is allowed to select the desired program and extract (de-multiplex) the corresponding packets via a demux 485. The de-multiplexed bit stream is at a variable rate. It is the encoder's responsibility to ensure the decoder buffer 490 never overflows or underflows. Additional constraints are therefore applied at the encoder.

This can be achieved using the techniques of the aforementioned U.S. patent application Ser. No. 09/553,457 to apply a constraint on the target rate for each regular frame.

2.6. Constraint on Max and Min Rate

We can also control the average bit rate over a certain number of frames by limiting the target number of bits for each frame within a specific range. This can be achieved using the techniques of the aforementioned U.S. patent application Ser. No. 09/553,457.

3. CHANGES IN PROGRAM GOPS

The program GOP structure (including GOP length, type and arrangement of pictures, and sub GOP length) plays an important role in determining a target rate for a frame, as shown in equations (3,4). However, a program GOP structure may vary from time to time. For example, for a transcoder, the input video bit stream may consist of segments of different materials/content, such as films, news, sports, music, etc., that are pre-encoded with different GOP structures. Another example is commercial insertion, where the inserted commercial may be pre-coded with a different GOP structure than the original program to be inserted.

In accordance with the invention, the bit allocation adapts to changes in the program GOP structures, e.g., by adjusting the size of the super GOP and other parameters for determining the target rates of frames.

3.1 Program sub_GOP Length

The following shows a general form of picture organization for an example program l. The first row is in display order and the second row is the corresponding encoding order:

$$\ldots B_{m-1}I_m B_{m+1}B_{m+2} \ldots B_{m+M_l-1}P_{m+M_l}B_{m+M_l+1} \ldots$$
$$P_{m+2M_l} \ldots I_{m+N_l} \ldots,$$
$$\ldots I_m B_{m-(M_l 31\ 1)}B_{m-(M_l 31\ 1)+1} \ldots B_{m-1}P_{m+M_l}B_{m+1} \ldots$$
$$B_{m+M-1}P_{m+2M_l} \ldots I_{m+N_l} \ldots,.$$

Here, the subscripts are the picture's temporal reference, and $N_l$ and $M_l$ are the GOP length and sub_GOP length, respectively. The pictures in the compressed video bit stream that are input to a transcoder are in encoding order. The display order is recovered at the decoder.

For an encoder that encodes uncompressed video data, the changes in sub_GOP length of a program are available since the GOP program structure is available, thus allowing the encoder to plan ahead for bit allocation.

However, for a transcoder, the changes in sub_GOP structures are embedded in the input pre-compressed bit stream. In accordance with the invention, the sub_GOP length of a program is calculated at each current frame/picture (I, P or B) if the previous frame is an I or a P picture by checking the temporal references of the current picture and the previous I or P picture. If the previous frame is a B-picture, we do not check the sub_GOP. In MPEG syntax, the temporal reference of a picture is included in the picture header that is located at the beginning of the segment of compressed bits for the picture. Specifically, the term "temporal_reference" is a 10-bit unsigned integer associated with each input picture. It is incremented by one, modulo 1024, for each input frame. For example, temporal_reference may have values of 67, 68, 69 and so forth. Hence, a transcoder (or, more specifically, the associated GOP structure monitors 142 or 152 of FIG. 1) can access the temporal reference of a current picture before the transcoder actually processes (transcodes) the picture. The temporal reference of the previous I or P picture is already available because the picture has been processed.

Figure 5:
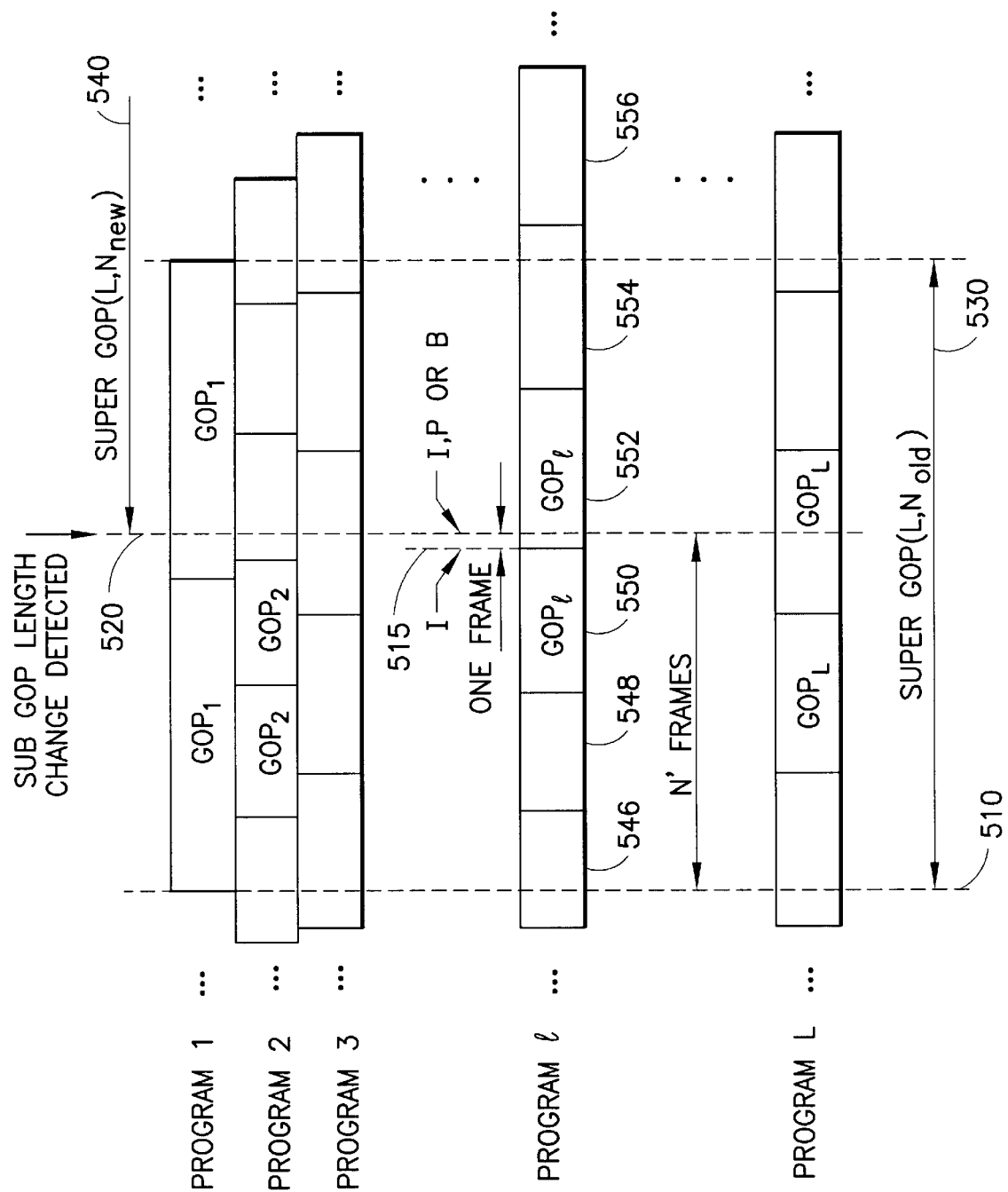
FIG. 5 illustrates a video program with a change in the sub_GOP length, and subsequent adjustment of the super GOP length, in accordance with the present invention.

FIG. 5 illustrates a video program with a change in the sub_GOP length, and subsequent adjustment of the super GOP length, in accordance with the present invention.

Note that the program GOPs for the different programs 1, . . . , L do not necessarily align with one another.

An example program l that is transcoded includes GOPs 546, 548 and 550 having a first GOP structure (GOP length and/or sub_GOP length), and GOPs 552, 554 and 556 having a second, different GOP structure. Note that the GOP structure can change for more than one program at the same time. The super GOP length and bit budget are adjusted accordingly.

Moreover, as mentioned, the programs may comprise transcoded data only, or both transcoded and encoded data.

At a time indicated at 510, an old super GOP 530 with length, $N_{old}$, is determined. A sub_GOP (the distance between two P-pictures in either encoding or display order) for each program does not change up until a time indicated at 520, when a new super GOP length, $N_{new}$, is determined. Let $^{temp\_ref\_pic1}$ and $^{temp\_ref\_pic2}$ be the temporal references for the previous I or P picture and the current picture for program l, respectively.

If the previous picture is an I or P picture, and the current picture is a B picture, the B picture should be displayed before the I or P (in display order). Thus, the B picture has a smaller temporal reference. Now, if the current picture is an I or P picture, the actual sub_GOP length for program l is:

$$M_{l,actual} = \text{temp\_ref\_pic2} - \text{temp\_ref\_pic1}. \quad (6)$$

Otherwise, if the current picture is a B picture, $$M_{l,actual} = \text{temp\_ref\_pic1} - \text{temp\_ref\_pic2} + 1 \quad (7)$$

No sub_GOP is determined for a current picture whose previous picture is a B-picture. The start of the current picture in FIG. 5, which is an I picture and the first picture of the GOP 552, is at a time 515. The start of the next picture is at a time 520.

Clearly, if $M_l = M_{l,actual}$, the current sub_GOP for program l is correct. Hence, no further action is needed. However, if $M_l \neq M_{l,actual}$, we set $M_l = M_{l,actual}$, and adjust other parameters as follows:

1. First, the program GOP length, $N_l$, has to be divisible by the new $M_l$ (i.e., integrally divisible—with no remainder). If not, we adjust it by $$N_l = [N_l/M_l] \cdot M_l \quad (8)$$

where [/] denotes integer division with truncation of the result toward zero.

For example, assume $N_l = 15$ and $M = 3$ initially. Then, M changes to M=2. Using eqn. 8, the adjusted program GOP length $N_l = 14$.

2. Second, if $N_l$ changes, we reset the super GOP length by using equation (1). The new super GOP 540 now starts right at the following picture, at time 520. Note that the program GOPs do not have to be aligned with the new super GOPs. The number of I, P and B pictures in the (new) super GOP 540 can also be calculated with the new super GOP length, say $N_{new}$, as, respectively, $n_{l,I} = N_{l,I}*(N/N_l) = N/N_l$, $n_{l,P} = N_{l,P}*(N/N_l) = N/M_l - n_{l,I}$, and $n_{l,B} = N_{l,B}*(N/N_l) = N - n_{l,P} - n_{l,I}$.

3. Finally, the nominal number of bits for the (new) super GOP is now equal to:

$$T_{L \times N_{new}} = (L \times N_{new}) \cdot R_{channel(bpf)}. \quad (9)$$

The number of bits for the first (new) super GOP 540, however, may be slightly different than for other, subsequent super GOPs that follow the super GOP 540 since the previous super GOP 530 (with length $N_{old}$) is an unfinished super GOP that has leftover bits that were previously allocated, but not yet used. In accordance with the invention, these bits can be allocated to the first new super GOP 540. Specifically, let $N_{old}$ be the old super GOP length and N' be the number of frames of program l in the old super GOP that have been processed. The remaining number of bits for the first new super GOP is then:

$$R = T_{L \times N_{new}} + [T_{L \times N'} - (T_{L \times Nold} - R)] \quad (10)$$

Here, $T_{L \times N'}$ is the nominal number of bits for L×N' frames and $(T_{L \times N_{old}} - R)$ is the number of bits used for the frames in the old (unfinished) super GOP 530. Hence, $[T_{L \times N'} - (T_{L \times N_{old}} - R)]$ denotes the leftover bits from the old (unfinished) super GOP 530.

With the updated information, we can determine the target rates for the current and future frames (eqns. 3 and 4). Note that the sub_GOP length of a program can be verified and/or corrected at each frame if the previous frame is an I or a P picture, and if necessary, other parameters are also adjusted accordingly (eqns. 8–10).

3.2 Program GOP Length

Let $N_{l,old}$ and $N_{l,new}$ be the GOP lengths of the previous and the current GOPs for program l, respectively. There are three possible cases regarding the GOP lengths, i.e., $$N_{l,new}=N_{l,old} \qquad (11)$$

$$N_{l,new}>N_{l,old}$$

$$N_{l,new}<N_{l,old}$$

For encoders, both $N_{l,old}$ and $N_{l,new}$ are available. However, for a transcoder, the information on GOP length is embedded in the input pre-compressed bit stream. Before completely processing the current GOP of program l, $N_{l,new}$ is not available.

We set the current GOP length $N_l=N_{l,old}$ for the transcoder. Clearly, if $N_{l,new}=N_{l,old}$, we have a correct GOP length for program l. Hence, no further action is needed.

Figure 6:
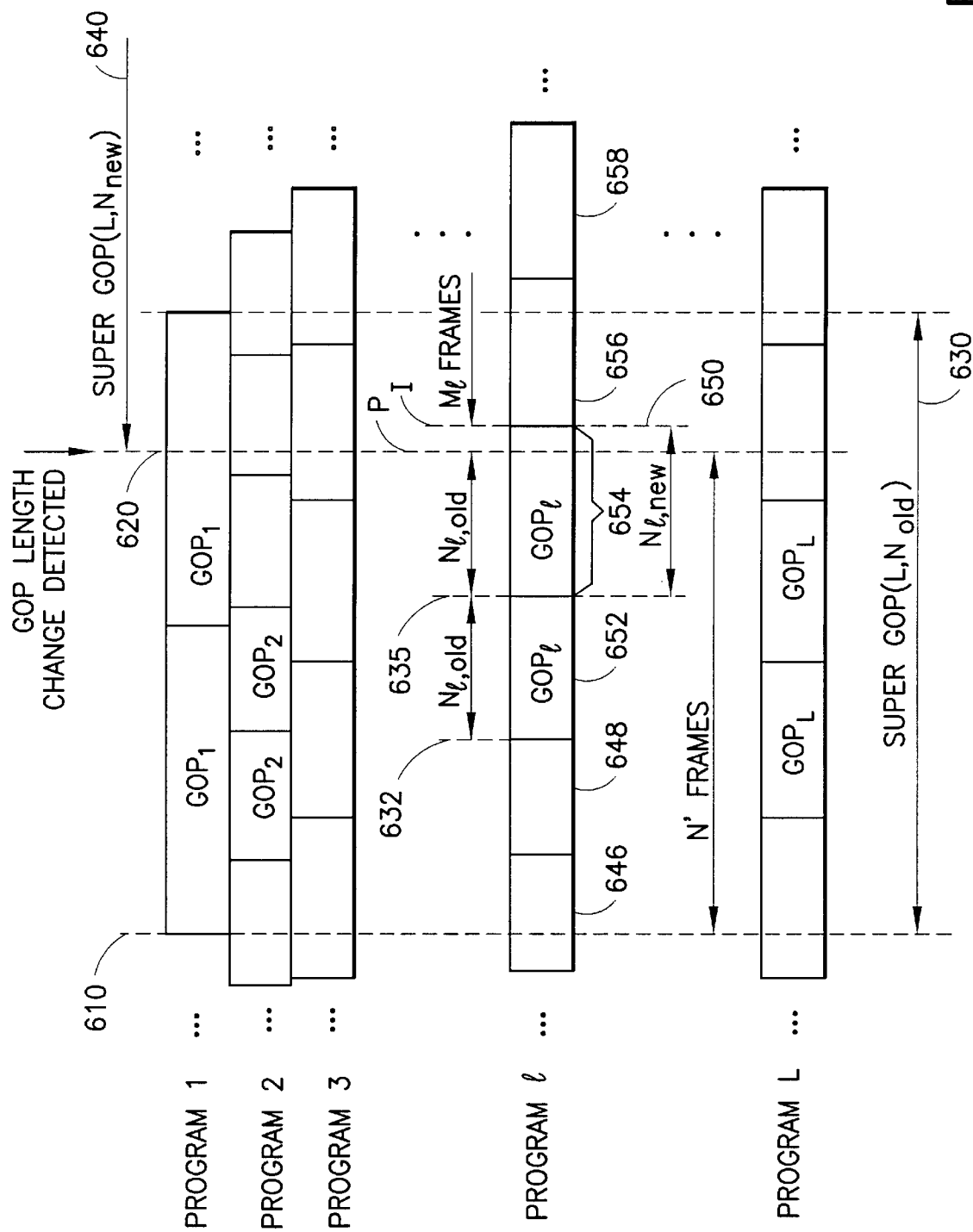
FIG. 6 illustrates a video program with an increase in the GOP length in accordance with the present invention.

FIG. 6 shows an example where the new GOP length for the current GOP is longer than the currently used GOP length.

Program l includes GOPs 646, 648 and 652 having a first GOP structure, and GOPs 654, 656 and 658 having a second, different GOP structure.

An old super GOP 630 starts at a time 610, while a new super GOP 640 starts at a time 620. Old GOPs extend, e.g., from a time 632 to a time 635, and from a time 635 to a time 620. A new GOP extends from a time 635 to a time 650.

If $N_{l,new}>N_l=N_{l,old}$, i.e., the actual (new) program GOP length is longer than the currently used (old) GOP length. The GOP structure monitor (142, 152) expects to reach a I picture at the end of the current GOP of $N_l$ frames, at time 620. However, the end of a program GOP is not actually reached at time 620. In accordance with the invention, this alerts the GOP structure monitor of a change in the GOP structure. Specifically, it can be concluded that the actual GOP length is longer than the currently-assumed GOP length.

Moreover, because of the nature of the program GOP structure (FIG. 2), the new GOP length will be at least $M_l$ (one sub GOP length) additional pictures longer. Here, we have assumed that the sub-GOP length M does not change within a GOP. We extend the current GOP of $N_l$ pictures by $M_l$ additional pictures, i.e., $$N_l=N_l+M_l. \qquad (12)$$

With the new $N_l$, we recalculate the super GOP length by equation (1), and the nominal number of bits for the first new super GOP (and the following super GOPs) by equation (2). The first new super GOP 640 is aligned with the current P picture of program l, as shown at time 620. Because of the leftover bits from the previous super GOP 630, the number of bits for the first new super GOP 640 is re-allocated as:

$$R=T_{L\times N_{new}}+[T_{L\times N'}-(T_{L\times N_{old}}R)] \qquad (13)$$

where $N_{old}$ and $N_{new}$ are the old and new super GOP lengths, respectively, and N' is the number of frames of program l in the old super GOP 630 that have been processed. If the extended GOP for program l is still shorter than the actual GOP, we repeat the above procedure (e.g., increasing $N_l$ by eqn. 12) until reaching the end of the actual GOP.

Figure 7:
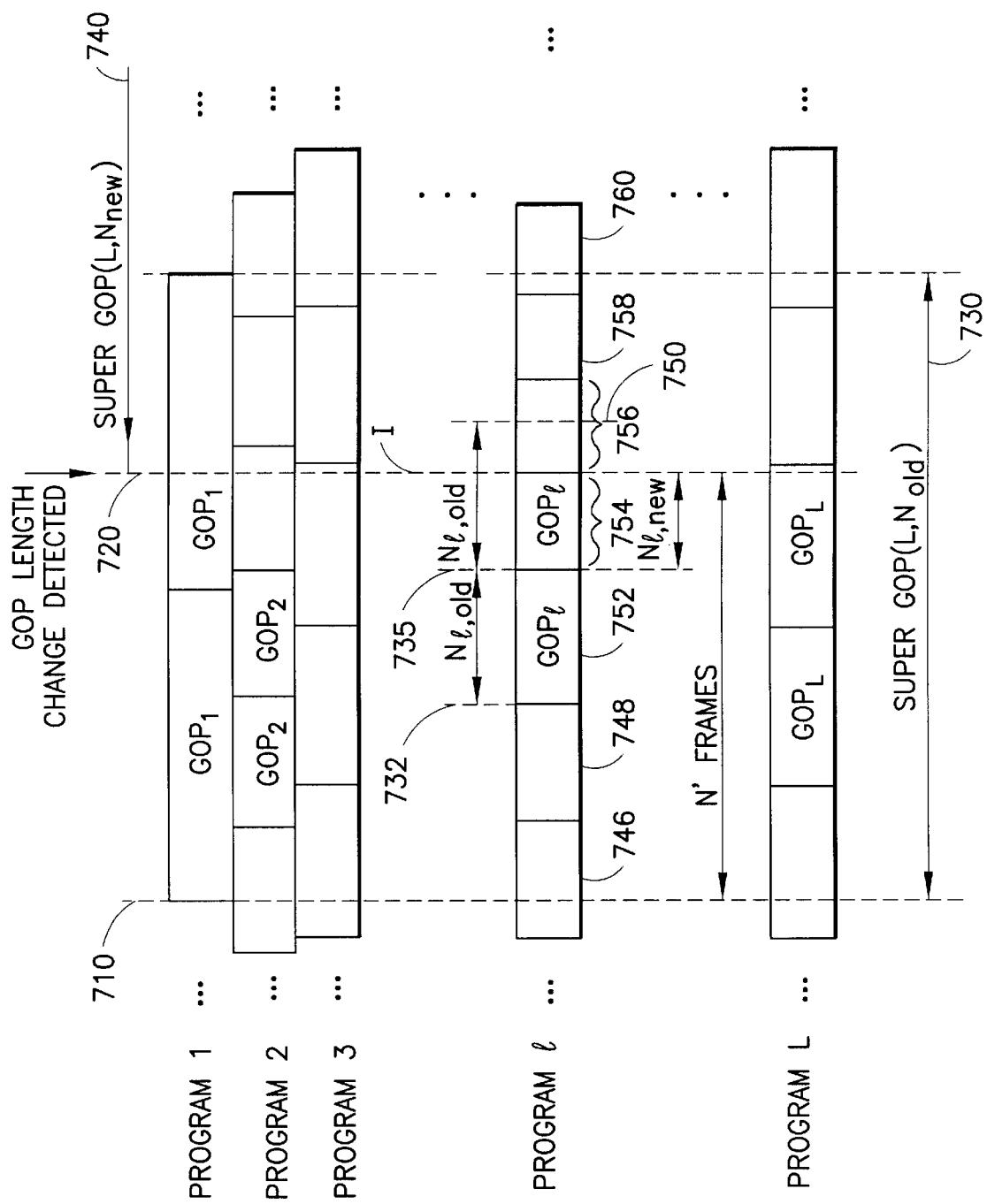
FIG. 7 illustrates a video program with a decrease in the GOP length in accordance with the present invention.

FIG. 7 shows an example where the new GOP length for the current GOP is shorter than the currently used GOP length.

Program l includes GOPs 746, 748 and 752 having a first GOP structure, and GOPs 754, 756, 758 and 760 having a second, different GOP structure.

An old super GOP 730 starts at a time 710, while a new super GOP 740 starts at a time 720. An old GOP extends from a time 732 to a time 735, and from a time 735 to a time 750. A new GOP extends from a time 735 to a time 720.

If $N_{l,new}<N_l=N_{l,old}$, i.e., the actual GOP length is shorter than the currently used GOP length, an I picture (which denotes the start of a new GOP—there is only one I picture in a GOP) will be reached (at time 720) before the end of the current GOP of $N_l$ frames. At this point, the GOP structure monitor knows the actual GOP length, $N_{l,new}$, since the GOP 754 has just concluded. We set $N_l=N_{l,new}$. Moreover, with the new program GOP length, N, we reset the super GOP length by (1), and recalculate the nominal number of bits for the new super GOPs by (2). Again, because of the leftover bits from the previous (unfinished) super GOP 730, the number of bits for the first new super GOP 740 may be slightly different than for subsequent super GOPs, that is, $$R=T_{L\times N_{new}}+[T_{L\times N'}-(T_{L\times N_{old}}-R)] \qquad (14)$$

where $N_{old}$ and $N_{new}$ are the old and new super GOP lengths, respectively, and N' is the number of frames of program l in the old super GOP 730 that have been processed.

4. RATE CONTROL

Once the target rate for a frame of a program is set, the next step is to achieve this rate, e.g., by adjusting the coding parameters, such as the quantization parameter, in the encoders and transcoders of the stat mux/remux system. Any suitable rate control scheme, such as those for use with the MPEG encoder, can be used. Some of them can be applied to the transcoders as well.

Preferably, joint rate control is used to dynamically distribute the channel capacity among the programs according to the programs' relative complexity measures.

5. CONCLUSION

A stat remux system is presented having encoders and transcoders that can handle both uncompressed digital video signals and pre-compressed video bit streams. The system implements a novel adaptive rate control, which dynamically distributes the channel capacity over the input video programs, either uncompressed digital video signals or pre-compressed video bit streams, on a frame-by-frame basis. The bit allocation strategy adopted in the adaptive rate control is able to address changes in picture organization (e.g., changes in GOP length or sub_GOP length) in the input pre-compressed bit streams. When such a change is detected, the bit allocation is recalculated.

Moreover, hierarchical bit allocation is provided on a super GOP level, then on a super frame level, and finally at an individual frame level.

Although the invention has been described in connection with various specific implementations, it should be appreciated that various adaptations and modifications can be made thereto without departing from the scope of the invention as set forth in the claims.

What is claimed is:

1. A method for transcoding a plurality L of pre-compressed video programs, comprising the steps of:

estimating a respective GOP structure for each video program;

allocating bits for transcoding the pre-compressed video programs according to a hierarchical scheme that includes at least: (a) a super group of pictures (GOP) level, wherein a super GOP comprises at least one GOP from each of the video programs, and (b) an individual frame level;

wherein said allocating step is initially responsive to said estimated respective GOP structures of the video programs;

monitoring the actual respective GOP structures of the pre-compressed video programs to detect any changes thereof; and when a change in the GOP structure of at least one of the video programs is detected, adjusting the allocation of bits for transcoding the video programs in the super GOP according to said change.

2. The method of claim 1, wherein:
said monitoring step monitors the GOP structure of the video programs on a frame-by-frame basis.

3. The method of claim 1, wherein:
the change in GOP structure is due to a change in a video source.

4. The method of claim 1, wherein:
the change in GOP structure is due to a commercial insertion in the associated video program.

5. The method of claim 1, wherein:
an aggregate of the transmission rates for the video programs is maintained within a total available channel rate.

6. The method of claim 1, wherein:
the video programs are communicated over a broadband communication network to a decoder population.

7. The method of claim 1, wherein:
the hierarchical scheme includes a super frame level between the super GOP level and the frame level; and
each super frame comprises L pictures at a common frame instant, one from each of the video programs.

8. The method of claim 1, wherein:
the L video programs have respective variable bit rates.

9. The method of claim 1, comprising the further step of:
determining whether a target bit rate that is set in said allocating step for a frame of pre-compressed data of at least one of the video programs is greater than a measured bit rate of the frame and, if so, reducing the target bit rate to the measured bit rate.

10. The method of claim 1, wherein:
the plurality of video programs further comprise at least one video program having uncompressed video data.

11. The method of claim 1, wherein:
the GOP structure comprises a program GOP length.

12. The method of claim 11, comprising the further step of:
starting a new super GOP, and allocating bits thereto, when a change in the length of a program GOP of at least one of the video programs is detected.

13. The method of claim 11, wherein said estimating of a respective GOP structure for each video program comprises providing an assumed value for the program GOP length before a measurement of the program GOP length can be made;
said method comprising the further steps of:
measuring the program GOP length when the measurement can be made; and
comparing the measured program GOP length to said value and, if there is a difference, setting said value to the measured program GOP length.

14. The method of claim 12, wherein:
the allocation of bits to the new super GOP accounts for unused bits from a previous super GOP that were previously allocated thereto but not used.

15. The method of claim 12, comprising the further step of:
calculating a length of the new super GOP based on the changed program GOP length.

16. The method of claim 14, wherein:
the unused bits are determined based on a number of frames processed in the previous super GOP.

17. The method of claim 1, wherein:
the GOP structure comprises a sub GOP length.

18. The method of claim 17, comprising the further step of:
starting a new super GOP, and allocating bits thereto, when a change in the length of a sub GOP of at least one of the video programs is detected.

19. The method of claim 17, wherein:
the sub GOP length is calculated after bits are allocated in said allocating step to an I picture.

20. The method of claim 17, wherein:
the sub GOP length is associated with a distance between one of successive I-pictures or successive P-pictures in a program GOP.

21. The method of claim 17, wherein:
when a current picture of one of the video programs is an I or P picture, and a previous picture is an I or P picture, the sub GOP length is determined according to a difference between temporal references of the current picture and the previous picture.

22. The method of claim 17, wherein:
when a current picture of one of the video programs is a B picture, and a previous picture is an I or P picture, the sub GOP length is determined according to a difference between temporal references of the current picture and the previous picture, plus one picture.

23. The method of claim 17, comprising the further step of:
calculating the sub GOP length after processing an I or P picture.

24. The method of claim 17, wherein said estimating of a respective GOP structure for each video program comprises providing an assumed value for the sub GOP length before a measurement of the sub GOP length can be made;
said method comprising the further steps of:
measuring the sub GOP length when the measurement can be made; and
comparing the measured sub GOP length to said value and, if there is a difference, setting said value to the measured sub GOP length.

25. The method of claim 17, wherein:
when a change in the sub GOP length is detected, calculating an associated new program GOP length.

26. The method of claim 25, wherein:
the new program GOP length $N_{l,new}$ is calculated according to $N_{l,new}=[N_{l,old}/M_{l,new}]*M_{l,new}$;
where $N_{l,old}$ is the previous program GOP length;
$M_{l,new}$ is the new sub GOP length; and
"/" denotes integer division with truncation of the result toward zero.

27. The method of claim 25, wherein:
after the new program GOP length is calculated, calculating a new super GOP length in accordance therewith, and allocating bits to the new super GOP accordingly.

28. The method of claim 1, wherein:
the GOP structure denotes picture types and their arrangement in a program GOP.

29. The method of claim 1, wherein:
a length of the super GOP is determined according to a least common multiple of the program GOP lengths of the respective video programs.

30. An apparatus for transcoding a plurality L of pre-compressed video programs, comprising:
means for inputting an estimated respective GOP structure for each video program;
means for allocating bits for transcoding the pre-compressed video programs according to a hierarchical scheme that includes at least: (a) a super group of pictures (GOP) level, wherein a super GOP comprises at least one GOP from each of the video programs, and (b) an individual frame level;
wherein said allocating means is initially responsive to said estimated respective GOP structures of the video programs;
means for monitoring the actual respective GOP structures of the pre-compressed video programs to detect any changes thereof; and
means for adjusting the allocation of bits for transcoding the video programs in the super GOP, when a change in the GOP structure of at least one of the video programs is detected, according to said change.

31. An apparatus for transcoding a plurality L of pre-compressed video programs, comprising:
a user interface for inputting an estimated respective GOP structure for each video program;
at least two transcoders for receiving pre-compressed data of corresponding ones of the pre-compressed video programs;
a rate control processor for allocating bits for transcoding the video programs according to a hierarchical scheme that includes at least: (a) a super group of pictures (GOP) level, wherein a super GOP comprises at least one GOP from each of the video programs, and (b) an individual frame level;
wherein said rate control processor is initially responsive to said estimated respective GOP structures of the video programs; and
a GOP structure monitor associated with each of the transcoders for monitoring the actual respective GOP structures of the associated pre-compressed video programs to detect any changes thereof;
wherein said rate control processor adjusts the allocation of bits for transcoding the video programs in the super GOP, when a change in the GOP structure of at least one of the video programs is detected, according to said change.

32. A method in accordance with claim 1, comprising the further steps of:
transcoding of said pre-compressed video programs; and
encoding a plurality of uncompressed video programs;
wherein said allocating step includes allocating bits for encoding of said uncompressed video programs in addition to allocating bits for transcoding of said pre-compressed video programs based on said hierarchical scheme.

33. An apparatus in accordance with claim 30, further comprising:
means for transcoding said pre-compressed video programs; and
means for encoding a plurality of uncompressed video programs;
wherein said allocating means allocates bits for encoding of said uncompressed video programs in addition to allocating bits for transcoding of said pre-compressed video programs based on said hierarchical scheme.

34. An apparatus in accordance with claim 32, further comprising:
at least one encoder for receiving uncompressed video programs;
wherein said rate control processor allocates bits for encoding of said uncompressed video programs in addition to allocating bits for transcoding of said pre-compressed video programs based on said hierarchical scheme.

* * * * *

UNITED STATES PATENT AND TRADEMARK OFFICE
CERTIFICATE OF CORRECTION

PATENT NO. : 6,643,327 B1
DATED : November 4, 2003
INVENTOR(S) : Wang

It is certified that error appears in the above-identified patent and that said Letters Patent is hereby corrected as shown below:

Column 16,
Line 35, change "32" to -- 31 --.

Signed and Sealed this

Twentieth Day of January, 2004

JON W. DUDAS
*Acting Director of the United States Patent and Trademark Office*